(12) United States Patent
Shoff et al.

(10) Patent No.: US 6,996,696 B2
(45) Date of Patent: *Feb. 7, 2006

(54) COMPRESSED FILE SYSTEM FOR NON-VOLATILE RAM

(75) Inventors: Daniel J. Shoff, Issaquah, WA (US); Jun Liu, Bellevue, WA (US); John C. Southmayd, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/135,199

(22) Filed: May 23, 2005

(65) Prior Publication Data

US 2005/0213377 A1 Sep. 29, 2005

Related U.S. Application Data

(63) Continuation of application No. 09/560,838, filed on Apr. 28, 2000, now Pat. No. 6,944,742.

(51) Int. Cl.
*G06F 12/00* (2006.01)

(52) U.S. Cl. ........................ 711/202; 711/170

(58) Field of Classification Search ............... 711/202, 711/203, 170, 206, 207, 171, 172, 111–114; 714/768, 769, 6, 8; 707/101
See application file for complete search history.

(56) References Cited

U.S. PATENT DOCUMENTS

| | | | |
|---|---|---|---|
| 5,699,539 A | 12/1997 | Garber et al. | |
| 5,864,859 A | 1/1999 | Franaszek | |
| 6,026,475 A * | 2/2000 | Woodman | 711/202 |
| 6,078,541 A | 6/2000 | Kitagawa et al. | |
| 6,240,419 B1 * | 5/2001 | Franaszek | 707/101 |
| 6,332,172 B1 * | 12/2001 | Iverson | 711/165 |
| 6,336,202 B1 | 1/2002 | Tsuchimoto et al. | |
| 6,401,181 B1 | 6/2002 | Franaszek et al. | |
| 6,535,995 B1 | 3/2003 | Dobbek | |
| 6,654,904 B1 * | 11/2003 | Andoh et al. | 714/8 |
| 6,681,305 B1 | 1/2004 | Franke et al. | |

FOREIGN PATENT DOCUMENTS

| | | |
|---|---|---|
| GB | 002395307 | 5/2004 |
| JP | 410069408 | 3/1998 |

* cited by examiner

*Primary Examiner*—Pierre-Michel Bataille
(74) *Attorney, Agent, or Firm*—Lee & Hayes, PLLC

(57) ABSTRACT

Methods and arrangements are provided that significantly reduce or otherwise minimize the amount of NVRAM required within a given computing device. For example, a novel data structure and management scheme are provided in a manner that allows an NVRAM sector-based memory to appear as providing significantly more storage space than it physically has. This is accomplished by mapping a higher number of virtual sectors to a fewer number of physical sectors. Data written to a plurality of virtual sectors is compressed and written to physical sector(s). The information needed to associate the virtual and physical sectors can be maintained in a virtual sector table within less expensive RAM. If power is lost and the virtual sector table is no longer available in the RAM, then on power-up the virtual sector table is recreated based in information that is imbedded within the stored data structure in physical sectors of the NVRAM. The scheme promotes data integrity by carefully controlling the compression and decompression processes and providing data and operational step backup information to insure that data within the NVRAM is not lost by a sudden power loss, etc.

6 Claims, 5 Drawing Sheets

COMPRESSED FILE SYSTEM FOR NON-VOLATILE RAM

CROSS REFERENCE TO RELATED PATENT APPLICATION

This is a continuation of and priority is claimed to co-pending U.S. patent application having Ser. No. 09/560,838 and a filing date of Apr. 28$^{th}$, 2000, now U.S. Pat. No. 6,944,742, for COMPRESSED FILE SYSTEM FOR NON-VOLATILE RAM of Shoff et al. This co-pending U.S. patent application is commonly assigned herewith and is hereby incorporated herein by reference for all that it discloses.

TECHNICAL FIELD

This invention relates generally to data storage mechanisms and, more particularly, to methods and arrangements for providing a compressed file system in non-volatile random access memory (NVRAM) or other like data storage mechanism.

BACKGROUND

During normal operations, information is stored within a computing device in the form of data. For example, in a typical personal computer (PC) data can be temporarily stored in a system or primary memory consisting of random access memory (RAM). Further data may be stored in a secondary memory, such as, a hard drive, a floppy drive, optical drive, etc. In such configurations, the secondary memory provides a non-volatile data storage alternative to the primary memory since the data stored in the primary memory would usually be lost if a power failure occurred. Solid-state non-volatile RAM (NVRAM), which is capable of retaining the stored data even after a power failure, is currently available but tends to be cost prohibitive for most PCs.

There are some computing devices, however, that can benefit from the use of NVRAM. One example is a set top box (STB) that is used to provide entertainment and related information services to subscribing users. Very little data storage is typically needed to provide such services, as compared to a full-fledged PC application. Thus, all or part of the primary memory in the STB can be NVRAM. This essentially eliminates the need to provide a secondary memory, such as, a hard drive, or the like. This can reduce the overall complexity, size and cost of the STB, for example.

Since NVRAM tends to be relatively expensive when compared to RAM and/or conventional secondary memory, there is an attendant need to significantly reduce or otherwise minimize the amount of NVRAM required within a given computing device.

SUMMARY

Methods and arrangements are provided that significantly reduce or otherwise minimize the amount of NVRAM required within a given computing device.

For example, a novel data structure and management scheme are provided in a manner that allows an NVRAM sector-based memory to appear as providing significantly more storage space than it physically has. This is accomplished by mapping a higher number of virtual sectors to a fewer number of physical sectors. Data written to a plurality of virtual sectors is compressed and written to physical sector(s). The information needed to associate the virtual and physical sectors can be maintained in a virtual sector table within less expensive RAM. If power is lost and the virtual sector table is no longer available in the RAM, then on power-up the virtual sector table is recreated based in information that is imbedded within the stored data structure in physical sectors of the NVRAM. The scheme promotes data integrity by carefully controlling the compression and decompression processes and providing data and operational step backup information to insure that data within the NVRAM is not lost by a sudden power loss, etc.

The above stated needs are met, for example, by a method that includes receiving file system data from an operating system, storing the file system data in a plurality of reserved sectors within a non-volatile memory, compressing the file system data stored within in the plurality of reserved sectors to create a compressed data block, and storing the compressed data block in at least one physical subsector within the non-volatile memory. In this manner the operating system can be provided with a plurality of operatively accessible virtual sectors resulting in a virtual memory capacity that exceeds the actual physical capacity of the non-volatile memory.

The method may further include, therefore, mapping the plurality of virtual sectors to at least one physical subsector through a Virtual Sector Table (VST) stored in a volatile memory and presenting the operating system with the VST. A Sector Allocation Table (SAT) within the volatile memory can be used to map physical subsectors to the VST. The SAT can be generated based at least on a unique group identifier that is stored in each physical subsector associated with storing the compressed data block. For example, the SAT can be generated during a device initialization time.

The step of storing the compressed data block in at least one physical subsector within the non-volatile memory may further include associating each physical subsector with a unique group identifier. The step of storing the compressed data block in at least one physical subsector within the non-volatile memory may further include writing each physical subsector associated with the compressed data block to the non-volatile memory in an a sequential order, but not necessarily a contiguous order.

In still other implementations, the step of storing the compressed data block in at least one physical subsector within the non-volatile memory further includes, maintaining input/output (I/O) operation status information within the non-volatile memory, during on-going I/O operations, that identifies the status of on-going I/O operations with respect to data stored within non-volatile memory.

An arrangement for use in providing an application access to a non-volatile memory is also provided. The arrangement includes an operating system and a device driver. Here, the operating system is configured to exchange input/output (I/O) requests with the application and exchange corresponding file system requests with the device driver. The device driver is configured to store the file system data received from the operating system in a plurality of reserved sectors within the non-volatile memory, compress the file system data stored within in the plurality of reserved sectors to create a compressed data block, and store the compressed data block in at least one physical subsector within the non-volatile memory. This arrangement can be included along with a processor configured to run the operating system and the device driver, and a non-volatile memory that is operatively coupled to the processor as part of a set top box or other like computing device.

A non-volatile computer-readable medium having stored thereon a data structure, is also provided. The data structure includes a raw sector map data and a plurality of raw sectors as identified in the raw sector map that are configurable to store uncompressed data during input/output (I/O) operations, I/O operation status data identifying on-going I/O operation, and a plurality of subsectors contiguously arranged and configured to support the identified on-going I/O operations by storing compressed data blocks derived from the uncompressed data.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

Figure 1:
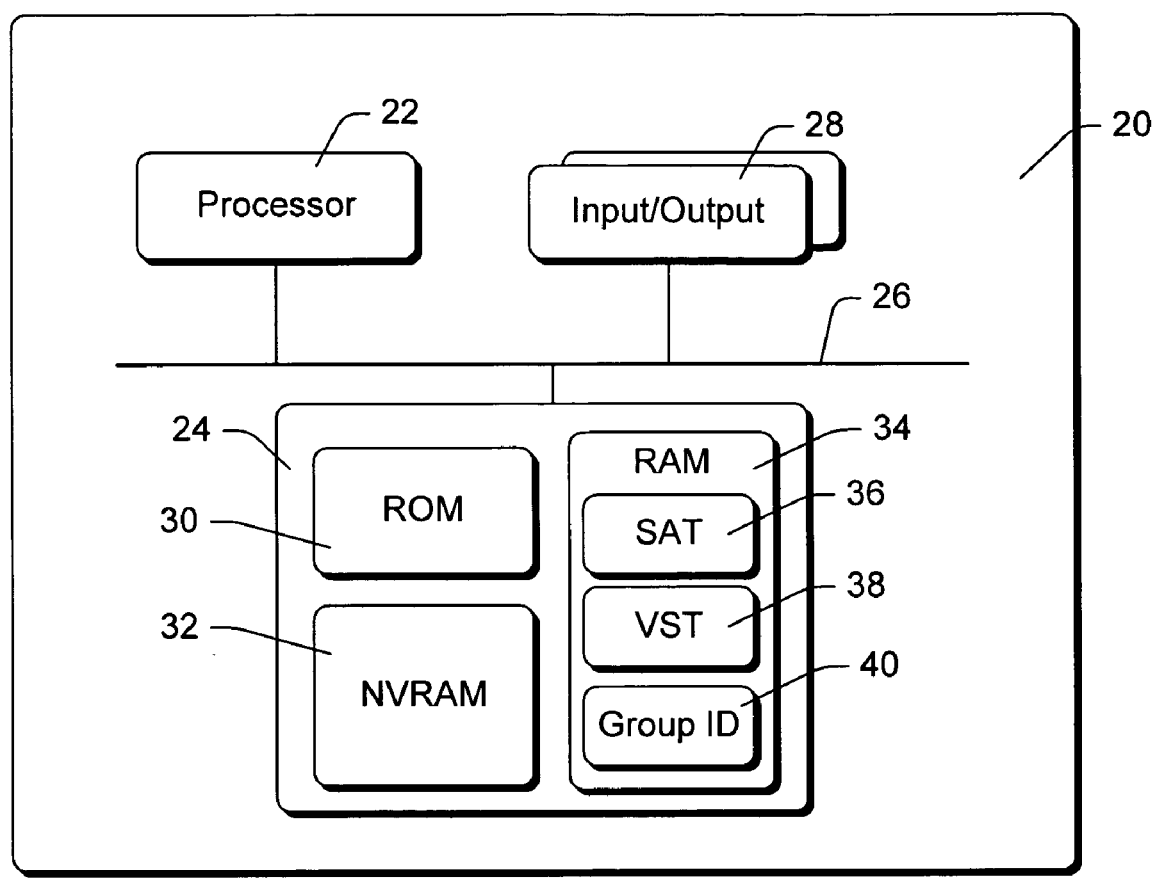
FIG. 1 is a block diagram depicting an exemplary computing device having a non-volatile random access memory (NVRAM).

The following description describes various methods and arrangements that are implemented in a computing device running Microsoft® Windows® CE. This is by way of example only. Those skilled in the art will clearly recognize that the various methods and arrangements as described below and shown in the Drawings can be used in any type of computing device having any type of operating system that is configured to read/write data from/to a non-volatile memory arrangement.

Windows® CE is a scalable operating system (herein after, referred to as the "OS") that is designed for a variety of embedded systems and products. Its multithreaded, multitasking, fully preemptive operating environment is designed specifically for hardware with limited resources, such as consumer electronic devices, specialized industrial controllers, and embedded communications devices. The OS also supports various hardware peripherals, devices, and networking systems. These include keyboards, mouse devices, touch panels, serial ports, Ethernet connections, modems, universal serial bus (USB) devices, audio devices, parallel ports, printer devices, and storage devices, such as PC Cards.

With this in mind, FIG. 1 is a functional block diagram depicting an exemplary computing device 20 having at least one processor 22 that is operatively coupled to a memory 24 through at least one bus 26. Processor 22 is further operatively coupled to at least one input/output device 28 through bus 26. In this example memory 24 includes read only memory (ROM) 30, non-volatile random access memory (NVRAM) 32, and random access memory (RAM) 34. During normal operations, a sector allocation table (SAT) 36, a virtual sector table (VST) 38 and a Group ID table 40 are generated and stored in RAM 34. These tables and the information in them are described in greater detail in subsequent sections. Those skilled in the art will recognize that computing device 20 may be implemented through the use of one or more integrated circuits, etc.

Figure 2:
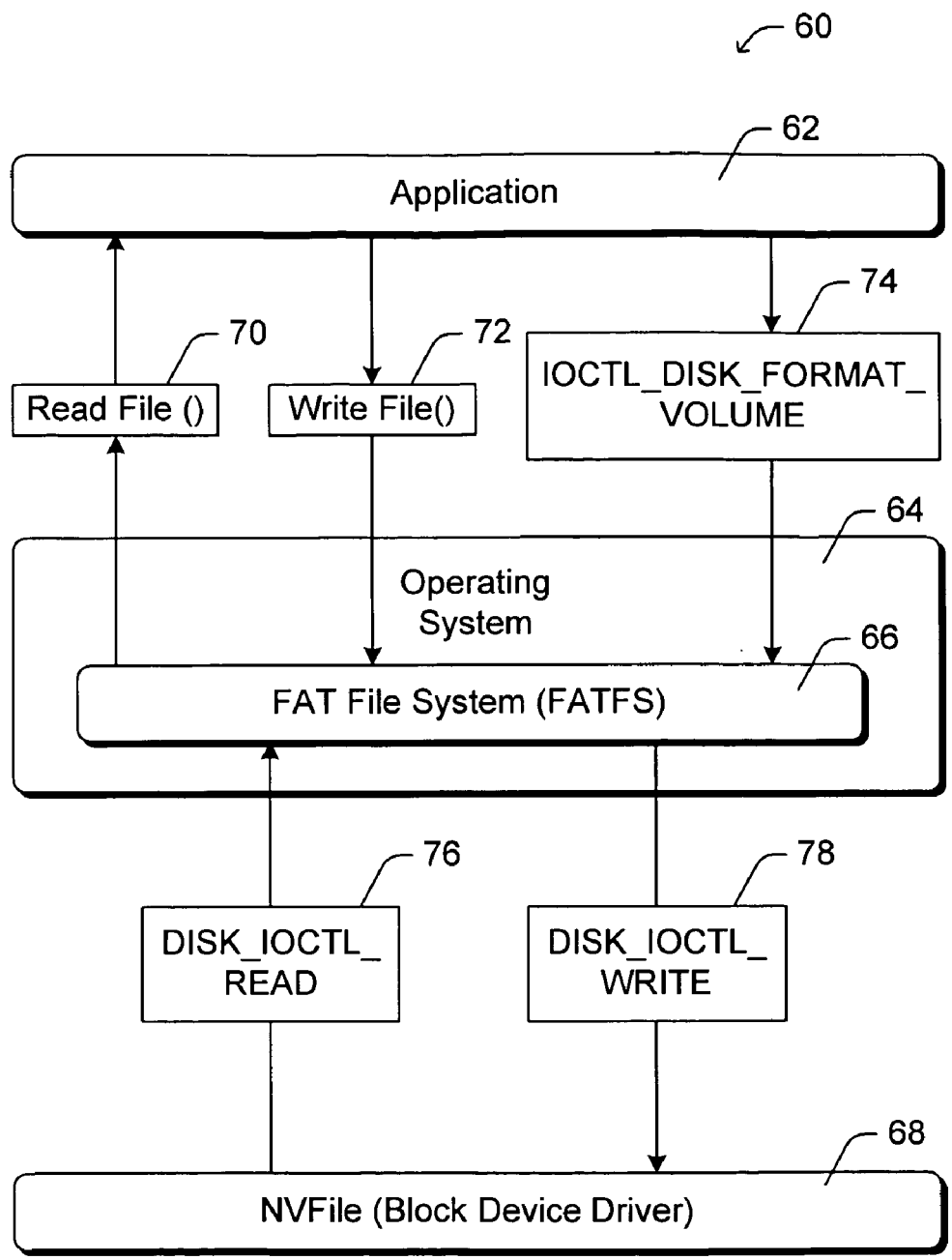
FIG. 2 is a block diagram depicting an exemplary functional arrangement of a computing device as in FIG. 1.

FIG. 2 is a functional block diagram depicting an exemplary functional arrangement 60 of computing device 20, for example, as in FIG. 1. Here, an application program 62 is operatively configured to interface with an operating system (OS) 64 and support reading and writing operations to a memory. OS 64 is in turn operatively configured to interface with a device driver, in this case, a block device driver, that further supports the read/write operation.

Block device drivers are provided for data storage devices that allow data to be read or written only in blocks of a fixed size. Block devices do not allow individual bytes of data to be read or written. Block sizes tend to be one or a few kilobytes; some common sizes are 512 bytes, 1 KB, 2 KB, and 4 KB. Block devices are ideally suited to mass storage and persistent storage applications, such as disk and tape drives, or NVRAM.

As shown in FIG. 2, OS 64 includes a FAT File System (FATFS) 66 to support an "NVFile" device driver 68. FATFS 66 essentially implements a logical file system and provides an abstraction between files in the application name space and devices in the device name space. For example, FATFS can exchange "Read File ( )" 70, "Write File ( )" 72 and "IOCTL_DISK_FORMAT_VOLUME" 74, as applicable, with application 62. The non-volatile file ("NVFile") device driver 68, in this example a block device driver, is responsible for guaranteeing safe I/O operations even when device 20 is interrupted by a power cycle. NVFile 68 exchanges a read request "DISK_IOCTL_READ" 76 and write request "DISK_IOCTL_WRITE" 78, as applicable, with FATFS 66. In the above example, both FATFS 66 and NVFile 68 are implemented as data link lists (e.g., dll modules).

NVFile device driver 68 creates a storage device of NVRAM 32 to persist raw data from the FATFS file system. As described herein, it is possible and advantageous to extend the available storage space by compressing file system data into NVRAM 32. This can be accomplished without making substantial changes to the FATFS layer supplied by the core OS 64.

The successful implementation of a compressed file system as described herein takes advantage of conventional software compression schemes, such as the LZX library from the OS. This exemplary software compression scheme tends to yields an average compression ratio of approximately 4:1.

The NVFile storage device in this example can be addressed by FAT-12 implementation using 512-byte sectors, and one sector per cluster, for example. Here, FATFS 66 notifies its underlying block device driver NVFile 68 when formatting or file (cluster) delete operations occur. FATFS 66 also performs a low-level format whenever a media format operation is performed. Communication between FATFS 66 and NVFile 68 insures correct reporting of "disk full" status and the existence of free space. For example, FATFS 66 notifies NVFile 68 when clusters are deleted, to insure that free space is reported accurately and free clusters can be properly identified as free space.

Figure 3:
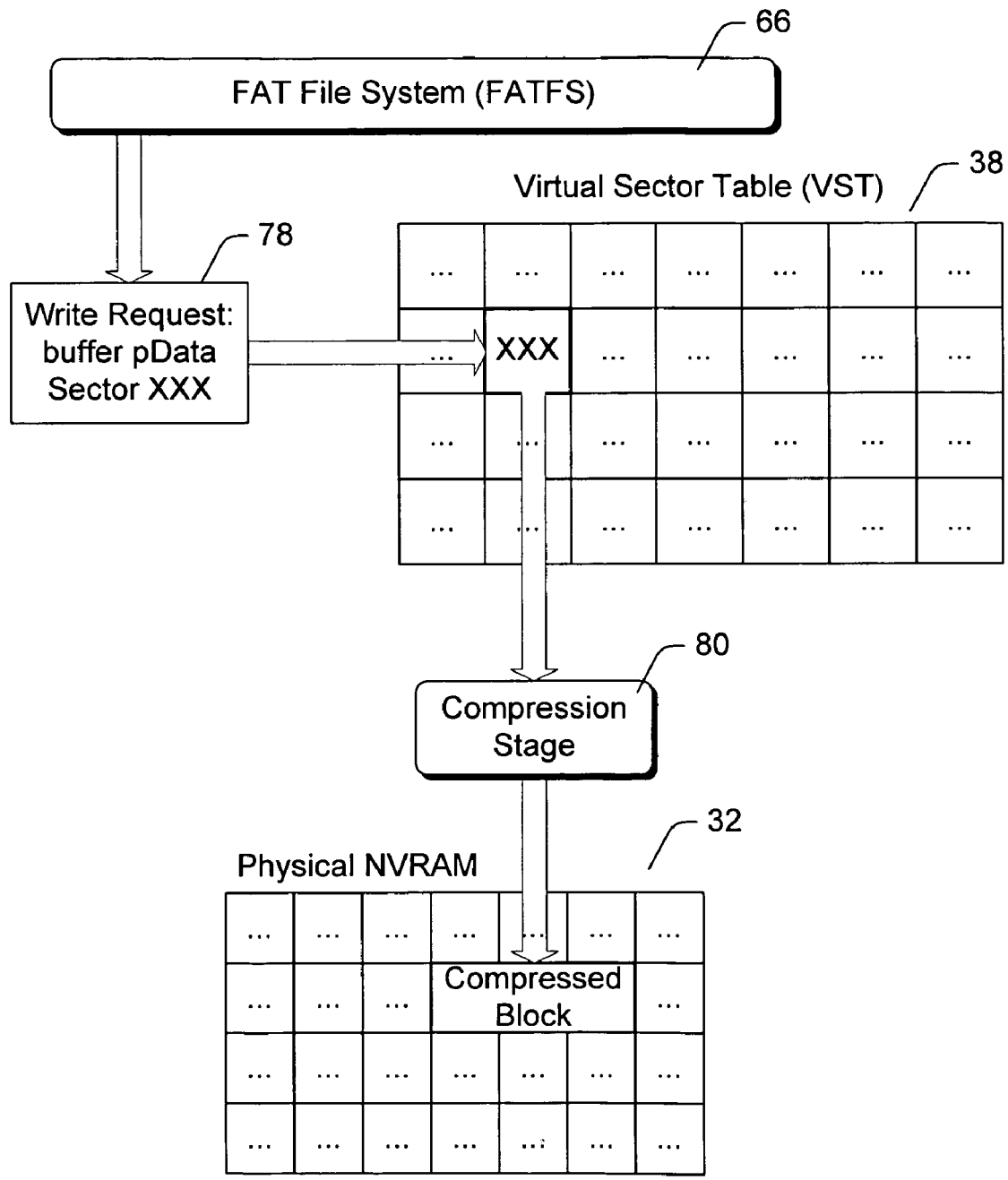
FIG. 3 is a functional block diagram depicting an arrangement for compressing file system data into an NVRAM as in FIG. 1.

Reference is now made to FIG. 3, which is a functional block diagram depicting an arrangement for compressing file system data into NVRAM 32 as in FIG. 1. As depicted, FATFS 66 provides a write request (78) that specifies a buffer "pData" (e.g., a block of data) and a "Sector XXX". Sector XXX is then mapped to a "virtual sector" within VST 38. Since the actual physical storage capacity of NVRAM 32 is less than that supported by VST 38, a compression stage

80 is introduced in NVFile to compress the "pData" and store a corresponding compressed block of data on NVRAM 32.

This process saves NVRAM for data and is designed to avoid wasting valuable NVRAM by persisting too much organizational information or tables of pointers. Thus, in this example, tables and pointers are almost exclusively maintained in RAM 34 rather than in NVRAM 32. Nevertheless, atomic/safe operations are provided to maintain data and organizational integrity across power-cycles. As will be appreciated, the methods and arrangements presented herein also tend to avoid heap fragmentation.

Figure 4:
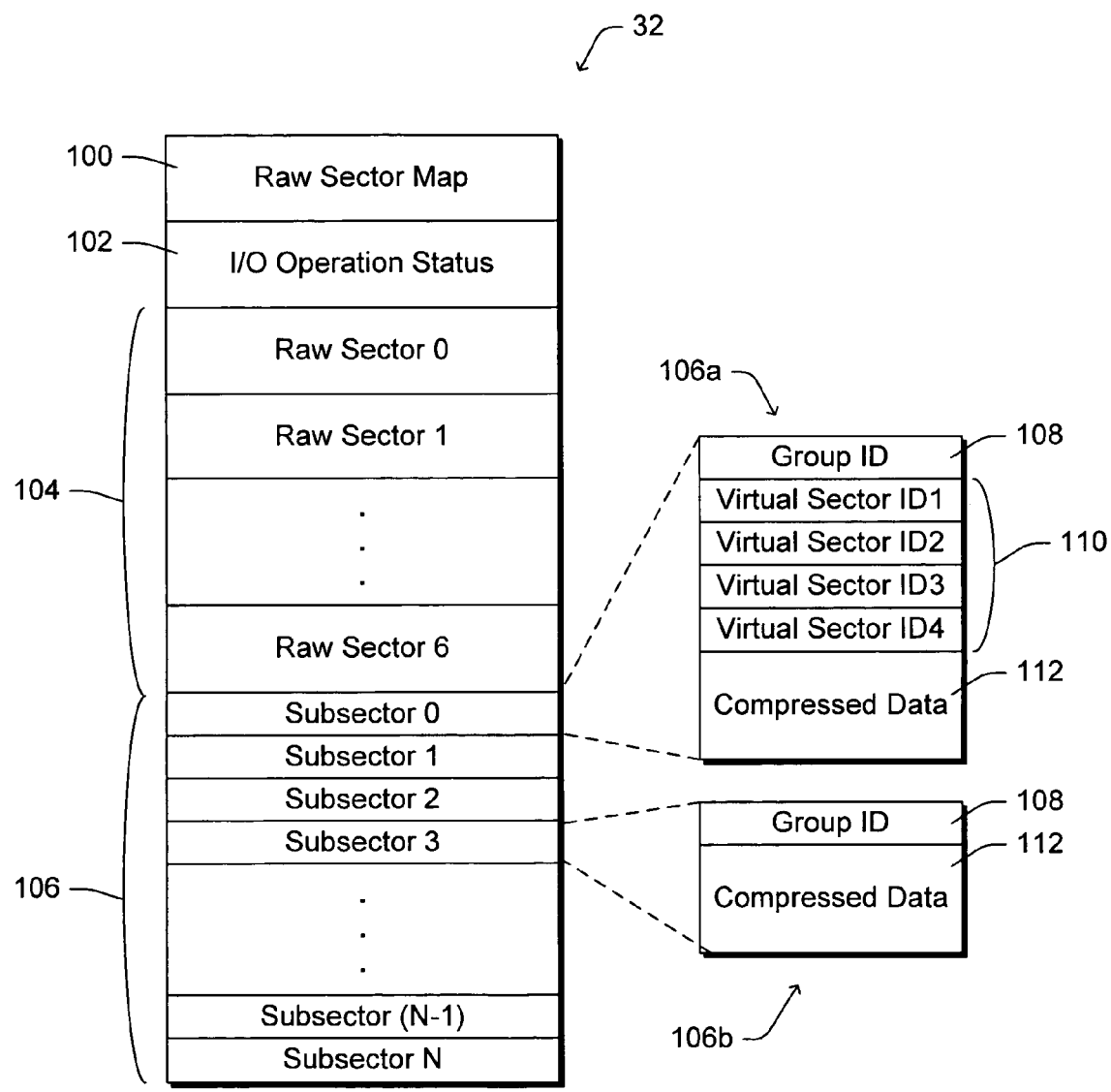
FIG. 4 is an illustrative diagram depicting the layout of an NVRAM as in FIG. 1.

FIG. 4 is an illustrative diagram depicting an exemplary layout of NVRAM 32. Here, NVRAM 32 includes a raw sector map 100, an I/O operation status 102, a plurality of reserved raw sectors 104 (numbered 0–6), and a plurality of subsectors 106 (numbered 0–N).

Let us assume, in this example, that NVRAM 32 is a 100-k byte memory within a set top box. Here, the beginning of the 100-k block of NVRAM 32 starts with a 28-byte raw sector map 100 (one DWORD for each reserved sector), then a series of seven 512-byte raw uncompressed reserved sectors 104. Following the end of the reserved sectors 104 are the 128-byte subsectors 106 to store compressed blocks of data from the file system.

In raw sector map 100, either a virtual sector number or an "unused" value is used to indicate what is stored in each reserved sector 104.

An I/O operation status 102 is provided between raw sector map 100 and the first reserved sector 104. I/O operation status 102 stores the current state of NVFile 68 in case of a power failure or normal power cycle during an I/O operation. For example, I/O operation status 102 can include a flag indicating the type of operation (write, delete, compress, etc.) and then some additional data depending on the context/stage of the operation.

Since, as described below, compression will normally occur after every fourth sector-write in this exemplary arrangement, seven reserved sectors 104 are employed to cache data in the very likely event that a power cycle will occur while the data are awaiting compression. Thus, all data from the file system is persisted somewhere while it is being moved.

The seven reserved sectors 104 include additional space for use during delete operations. For example, as part of a delete operation the compressed block containing the deleted cluster must be decompressed and reassembled with a new fourth sector. To provide for safe/atomic operation, all four sectors of that particular compressed block are stored in reserved sectors 104 until such time as the delete operation and recompression has been successfully completed.

The remaining space in NVRAM 32 is divided into 128-byte subsectors where compressed data blocks are stored. Each 128-byte subsector will begin with a group ID 108 (or marked "unused"), as shown in greater detail in subsectors 106a and 106b. Group ID 108 will identify which subsectors 106 belong to which compressed block, since they will not necessarily be written contiguously. In addition, as depicted in subsector 106a, the first subsector of a compressed block within NVRAM 32 will have, following the group ID 108, four virtual sector numbers 110 to identify where the data belongs in the real file system.

Figure 5:
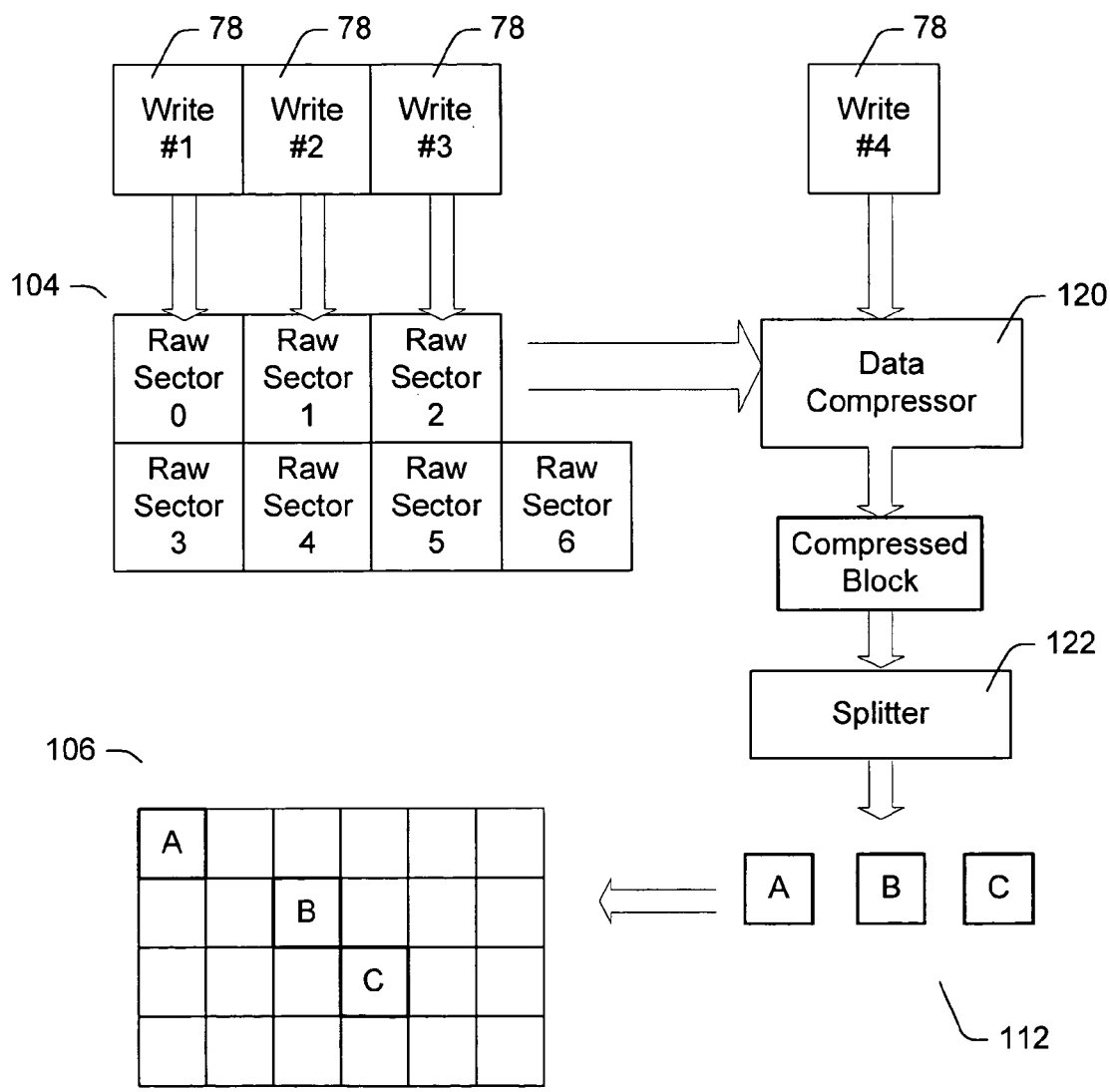
FIG. 5 is an illustrative/functional block diagram file system data being compressed and stored in an NVRAM as in FIG. 1.

FIG. 5 is an illustrative/functional block diagram file system data being compressed and stored in subsectors 106. Here, it is assumed that write requests #1, #2, and #3 have each been received and stored in raw sectors 0, 1, and 2, respectively. When write request #4 is subsequently received, all four data blocks are provided to a data compressor function 120 to produce a compressed block of data. The compressed block of data is then provided to a splitter function that stores pieces A, B and C of the compressed data in unused subsectors 106.

The Sector Allocation Table (SAT) 36 is essentially the "glue" relating the compressed block subsectors 106 of NVRAM 32 to the Virtual Sector Table (VST) 38 that is presented to the file system. Group IDs 108 are stored in compressed subsectors to allow for generation of SAT 36 at boot-up/init time. SAT 36 is basically a fixed-size mirror of the compressed-block subsectors 106 in NVRAM 32. There is one SAT entry for each compressed subsector 106, and each one will either be marked "unused" or indicate the next compressed subsector 106 in the chain. The last member of a chain will point to itself to mark the end.

SAT information is not be stored directly to NVRAM 32, but rather inferred at boot time using Group ID 108 and the Virtual Sector Numbers 110 that are stored in every physical compressed subsector 106. The Group ID number and the sequential order in which subsectors having a common Group ID 108 are written/read, will be used to generate the compressed subsector chain information in SAT 36.

At boot-time, for example, each NVRAM subsector 106 is read, in order from the beginning to the end of the subsector storage space. The first byte of each subsector contains either an "unused" value, or a Group ID 108. For each unique Group ID 108, every following subsector 106 with a matching Group ID 108 will be associated with that first subsector 106. The resulting chain of associated subsectors 106, in the order found, will eventually comprise a compressed block that can be reassembled and decompressed. For the first unique Group ID found, an entry is made in the SAT that is later filled in with the offset address of the next subsector 106 in that group. When the final subsector 106 is found (determined only by reaching the end of the NVRAM and finding no more subsectors in that group), the final SAT 36 entry is marked with its own address, indicating the end of the chain.

As described above, instead of mapping FATFS sectors directly to like-sized blocks of NVRAM 32, NVFile 68 presents VST 38 to FATFS while actually storing compressed blocks of data in the actual NVRAM subsectors 106. In order to minimize NVRAM overhead of this scheme, VST 38 is generated on the fly from this information at boot time, rather than stored in NVRAM in its entirety. In addition, a small portion of uncompressed data is stored in reserved raw sectors 104 of NVRAM 32 to persist sectors that have been written but not had a chance to compress yet.

To properly generate VST 38 at boot time, it is necessary to maintain and persist (during write operations) the relationship between the compressed data blocks and the virtual sectors. This relation is stored in the table of Group IDs 40, which map virtual sectors to groups of physical compressed subsectors 106.

When a new group of four sectors is compressed, they are assigned an unused Group ID 108. A table is stored at the beginning of the compressed data block, listing the virtual sector numbers represented by the compressed block. This relationship between the Group ID, physical subsectors, and virtual sectors numbers, is maintained at runtime. During initialization, Group ID table 40 is therefore dynamically generated, and maintained during all I/O operations.

By way of example, each entry in VST 38 can be a pointer to the first SAT entry corresponding to that virtual sector. For each compressed block containing four virtual sectors of data, there will be four VSTs pointing to its first SAT entry.

The I/O operation can then start from that SAT entry and simply "walk" the pointers to retrieve and reassemble the entire compressed block.

The purpose of Group ID 108 is to store as little organizational (i.e., non-data) information as possible in NVRAM. Every virtual sector in the VST must point to a compressed block, but since each compressed block contains four virtual sectors, otherwise unrelated virtual sectors will share the Group ID they reside in.

When four sectors are compressed, the new compressed block is assigned the next-unused Group ID 108 from the Group ID table 40 in RAM 34. Group ID 108 itself is saved as the first byte in each physical sector that the compressed block gets stored in.

During boot-up time, Group ID table 40 is re-created based on the stored Group ID information. This can be accomplished by looping iteratively though the NVRAM physical subsectors, matching up all of the sectors with others sharing the same Group ID 108 to reestablish the associative relationship. Then, the virtual sector numbers and Group Ids can be linked in the table in RAM 34.

FIG. 3 demonstrates how a sector write request from the file system is routed through VST 38, and the data buffer is compressed and stored in a compressed block of NVRAM 32.

As shown in the example of FIG. 5, to increase the efficiency of the data compression, four sectors are compressed at a time rather than just one. However, there is no guarantee that write operations will come in four-sector increments. As a result, a buffer is persisted which can store uncompressed data that is waiting to be compressed. The first "line" of physical NVRAM (raw sectors "0", "1", and "2") is reserved for three raw sectors, and once those are filled they can be combined with the fourth sector of incoming data, to produce a compressed block.

The compressed block will then be split so that it can fit into a number of smaller physical memory subsectors 106. How many subsectors are required will depend on the size of the final compressed block. Pieces of the compressed block are then copied into NVRAM 32 and stored persistently.

The location of free physical memory sectors may be determined using an iterative loop to find the next available unused subsector, if one is available. Since it is difficult to know ahead of time the final size of a compressed block, it is preferable to allow for fragmentation to occur so as to make better use of the available memory space.

As part of the write operation, NVFile is also responsible for maintaining the integrity of the Group ID table 40. As well as updating the dynamic Group ID table 40 in RAM 34 to reflect the new write operation, it must also store the correct Group ID 108 info in the subsectors 106 that are written.

After the compressed block is split into subsectors 106, they must be kept in order so that the original compressed block can be recreated later for decompression. From the beginning to the end of NVRAM 32, subsectors 106 belonging to any compressed block will be in order; there will be no actual pointers stored in NVRAM 32 for purposes of maintaining subsector chains.

An incoming Read I/O operation will result in a hit on VST 38, where actual file system sectors correspond to locations of NVRAM compressed blocks. Since multiple virtual sectors are stored in a single compressed block, and the compressed block must be decompressed to retrieve data, the entire compressed block must be reassembled. Since this is true for any virtual sector residing within the block, virtual sectors will all point to the beginning of their respective compressed blocks. Further addressing is stored in the compressed block header and decoded after decompression.

When a virtual sector hit point to any physical memory portion within a compressed block, the first memory portion is read, and the chain followed to each memory portion comprising the compressed block. The compressed block can then be reassembled in a RAM memory buffer, decompressed, and the resulting raw data returned to the file system.

There is a chance that a VST hit will point to an uncompressed raw sector 104 in the reserved line of physical NVRAM 32. In these cases, the uncompressed data will simply be read straight through and returned to the file system.

When a virtual sector is deleted by FATFS, the compressed block in which it resides is decompressed, and reassembled without the deleted data. If one or more uncompressed sectors are already waiting in the reserved area 104, one of them can be combined with the remaining three from the compressed block to write a new block of four sectors. However, the existing compressed block cannot be deleted until a new one is written. In order to insure safe/atomic operation, it is important to reserve four additional uncompressed sectors 104 (i.e., raw sectors "3", "4", "5", and "6") in the worst case but likely event that the first line of raw sectors 104 (i.e., raw sectors "0", "1", and "2") are already full when a cluster is deleted.

Deleted virtual sectors will be marked as unused in VST 38 and SAT 36, and their former Group ID 108 is marked "unused".

A common scenario is to have a FATFS sector re-written with new data. This operation takes place in much the same way as the aforementioned delete operation. The main difference is that instead of finding a new virtual sector to replace the deleted one, a new compressed block and subsector chain are stored using the new data from the updated sector.

FATFS 66 may also be modified to notify NVFile 68 via an IOCTL when a format operation takes place. This way NVFile can mark all of the clusters as unused and reset all of the tables. It is important that this notification take place so that the status of the used versus free sectors is consistent between the file system and NVFile 68.

It should be understood that the methods and arrangements described herein are not limited to data compression stages having compression ratios of 4:1, memory layouts having seven reserved sectors, raw sectors of 512 bytes, or compressed sectors of 128 bytes. For example, one or more of these parameters can be higher or lower depending upon the computing device.

Thus, although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A system comprising:
   means for receiving file system data;
   means for storing the file system data in a plurality of reserved sectors within a non-volatile memory;

means for compressing the file system data stored within the plurality of reserved sectors to create a compressed data block; and means for storing the compressed data block in at least one physical subsector within the non-volatile memory, wherein the physical subsector is associated with at least one virtual sector identifiable through sector allocation information stored in a volatile memory that is operatively accessible by an operating system, wherein the means for receiving file system data further includes means for presenting an operating system with a plurality of operatively accessible virtual sectors resulting in a virtual memory capacity that exceeds the actual physical capacity of the non-volatile memory, wherein the means for storing the compressed data block in at least one physical subsector within the non-volatile memory further includes means for mapping the plurality of virtual sectors to at least one physical subsector through a Virtual Sector Table (VST) stored in the volatile memory and presenting the operating system with the VST, and wherein the means for mapping the plurality of virtual sectors to at least one physical subsector through the Virtual Sector Table (VST) further includes means for providing a Sector Allocation Table (SAT) within the volatile memory, the SAT mapping the physical subsectors to the VST.

2. The system of claim 1, wherein the means for providing a Sector Allocation Table (SAT) within the volatile memory further includes means for generating the SAT based at least on a unique group identifier that is stored in each physical subsector associated with storing the compressed data block.

3. The system of claim 2, wherein the Sector Allocation Table (SAT) is generated during a device initialization time.

4. A computing system comprising:
one or more processors;
one or more computer-readable media; and
computer-readable instructions on the one or more computer-readable media which, when executed by the one or more processors, cause the one or more processors to perform acts comprising:

receiving file system data;
storing the file system data in a plurality of reserved sectors within a non-volatile memory;
compressing the file system data stored within the plurality of reserved sectors to create a compressed data block; and
storing the compressed data block in at least one physical subsector within the non-volatile memory, wherein the physical subsector is associated with at least one virtual sector identifiable through sector allocation information stored in a volatile memory that is operatively accessible by an operating system, wherein receiving file system data further includes presenting an operating system with a plurality of operatively accessible virtual sectors resulting in a virtual memory capacity that exceeds the actual physical capacity of the non-volatile memory, wherein storing the compressed data block in at least one physical subsector within the non-volatile memory further includes mapping the plurality of virtual sectors to at least one physical subsector through a Virtual Sector Table (VST) stored in the volatile memory and presenting the operating system with the VST, and wherein mapping the plurality of virtual sectors to at least one physical subsector through the Virtual Sector Table (VST) further includes providing a Sector Allocation Table (SAT) within the volatile memory, the SAT mapping the physical subsectors to the VST.

5. The computing system as recited in claim 4, wherein providing a Sector Allocation Table (SAT) within the volatile memory further includes generating the SAT based at least on a unique group identifier that is stored in each physical subsector associated with storing the compressed data block.

6. The computing system as recited in claim 5, wherein the Sector Allocation Table (SAT) is generated during a device initialization time.

* * * * *